BURT & HILDRETH.
Car Starter.
No. 68,601.
Patented Sept. 10, 1867.
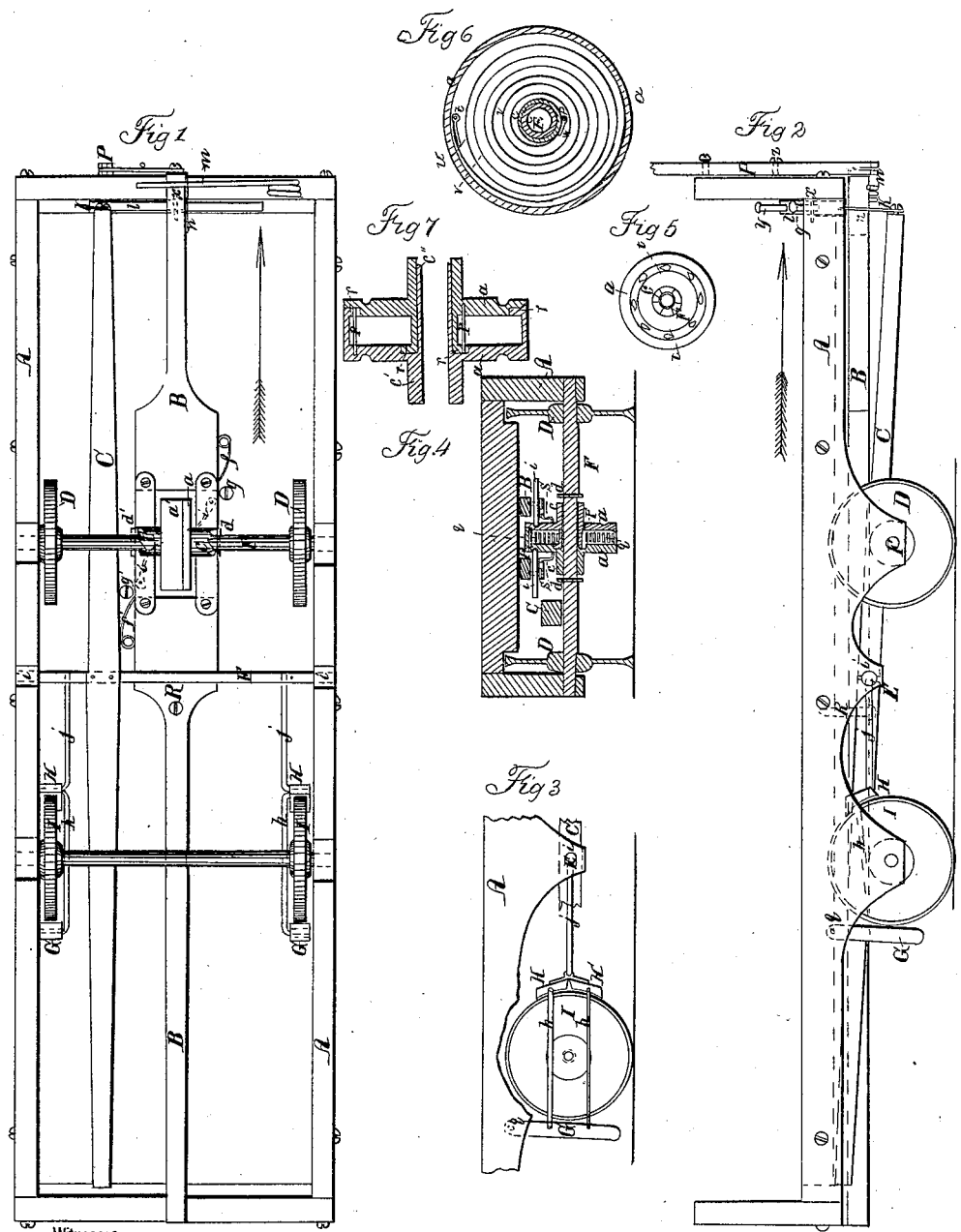

United States Patent Office.

GEORGE E. BURT AND EDWIN A. HILDRETH, OF HARVARD, MASSACHUSETTS.

Letters Patent No. 68,601, dated September 10, 1867.

IMPROVED CAR-BRAKE FOR STOPPING AND STARTING CARS.

The Schedule referred to in these Letters Patent and making part of the same.

TO ALL WHOM IT MAY CONCERN:

Be it known that we, GEORGE E. BURT and EDWIN A. HILDRETH, both of the town of Harvard, county of Worcester, and State of Massachusetts, have invented a new and useful improvement in Car-Brakes; and we do hereby declare that the following is a full and exact description thereof, reference being had to the accompanying drawings, and to the letters of reference marked thereon, in which—

Figure 1 is an inverted plan of a car having our invention applied to it.

Figure 2 is a side view of the same.

Figure 3 is a side view of a car-wheel, showing a double guard brake, so arranged as to act powerfully upon the wheel when turning in either direction.

Figure 4 is a vertical transverse section of the car through the centre of the axle F.

Figure 5 is a side view of the spring-case $a\ a'$.

Figure 6 is a longitudinal section of the spring-case $a\ a'$, showing the manner of attaching the spring to the case.

Figure 7 is a transverse section of the spring-case $a\ a'$.

Similar letters of reference indicate corresponding parts.

The nature of our invention consists in constructing car-brakes in such a manner that a moving car may be stopped, and the force of the momentum retained, to be again applied to the wheels, so as to propel the car forward or backward, or assist in ascending an inclined plane. Also in constructing a guard-brake, (to be used especially in case of accident or when the car is to be suddenly stopped,) so arranged that the friction between the wheel and the brake tends to force the latter down suddenly and effectually, with but little effort of the operator. Also in a device for attaching the spring securely to the spring-case, so that it may operate freely in either direction, without liability of breaking. Also in constructing the spring-case in such a manner as to avoid the friction caused by its tendency to twist on the axle when in operation.

To enable others skilled in the art to make and use our invention, we will proceed to describe its construction and operation.

These improvements may be attached to one pair or more of wheels of any car of the usual construction.

A is a car-truck; I and D are the wheels; F is an axle; $a\ a'$ is a spring-case placed loosely on the axle F, and provided with teeth on the hubs $c\ c'$ to clutch the pins $d\ d'$, fixed firmly in the axle F, figs. 1 and 4. B is a lever, to which are attached ratchets $e\ e'$, springs $f\ f'$, fig. 1, and guides $s\ s'$, fig. 4, and is pivoted to the car or truck at R, figs. 1 and 2. C is the guard-brake lever, firmly fixed to the shaft E, which rocks in the bearings $i\ i$, in the truck A, figs. 1, 2, and 3; and G G are brakes pivoted to the truck A, at $q$. H H are brake-pads, connected with the brakes G G by rods $h\ h$, and with the shaft E by the arms $j\ j$, figs. 1, 2, and 3. $l$ is a lever, having treadle-posts $y\ y'$, is pivoted in its centre to the car at $x$, and connected with the guard-brake lever C by the link $k$, figs. 1 and 2. P is the operating lever pivoted to the car at $z$, and connected with the lever B by the link $o$, figs. 1 and 2. $m$ is a spring provided with notches for holding the lever B in its different positions. $g\ g'$ are stops to disengage the ratchets $e\ e'$, fig. 1, from the spring-case. The spring-case $a'$ is constructed with a recess for holding the spring $v$, which is covered by the disk $a$. Both the case $a'$ and disk $a$ are provided on their sides with seats $t\ t$, fig. 5, for the ratchets $e\ e'$, fig. 1. The case $a'$ is made to extend nearly through the hub of the disk $a$, and upon this extension, marked $c''$, the disk revolves, the construction of the two, as shown in figs. 7 and 4, giving a long bearing for both, and the lips $r\ r'$ made by recesses, forming supports for both ends of the spring-pivots $p\ p'$, seen in figs. 4, 6, and 7. The case $a'$ and disk $a$ have clutch-teeth cut on the ends of their hubs $c'$ and $c$, which engage with the pins $d'\ d$ in the axle F, figs. 1 and 4. The ends of the spring $v$ are provided with pivot-boxes, $u$ and $w$, fig. 6, for the pins $p\ p'$, figs. 4, 6, and 7, on which they play freely. A double brake, to act upon the wheel in turning in either direction, may be constructed, as represented in fig. 3, by the addition to the brake, as before described, of the rod $h'$ and pad H'. The brake G may be connected to the pad H' by rods $h'$ passing on both sides of the wheel I, thus giving double the strength, and holding them more firmly in position.

Operation.

When the car is set in motion on the track, (in the direction indicated by the arrows,) with the brakeman in his place on the platform, the operating lever P should stand perpendicularly. It is held in this position by the central seat in spring $m$, which holds the lever B in the centre. While the lever is in this position (with the guard-brake up,) the car can move forward or backward freely. But when the car is to be stopped, the brakeman moves the lever P to his left; this actuates the lever B, the guides $s\ s'$ move the spring-case $a\ a'$, and the clutch-teeth on the end of the spring-case $a'$ clutch the pin $d'$ in the axle F. The ratchet $e$ holds the disk $a$ from revolving. The stop $g'$ detaches the rachet $e'$, fig. 1, and allows the spring-case $a'$ to revolve with the wheels. Thus the whole force of the momentum of the car is exerted on the spring $v$, which is wound up, and the car thus stopped with an easy motion, the whole onward force being retained in the spring $v$. But with the lever P remaining in this position, the tendency of the force accumulated in the spring $v$ is to run the car backward. By moving the lever P back to a perpendicular position, the lever B is again brought into its central position, and by means of guides $s\ s'$ placed on the lever B, fig. 4, the spring-case $a'$ is freed from the pin $d'$ at the same time that the ratchet $e'$ is relieved from the action of the stop $g'$. The ratchet $e'$ acts upon the case $a'$ and holds the force of the spring, thus leaving the axle and wheels free, so that the car will remain stationary for passengers to get on or off. The springs $f\ f'$ actuate the ratchets $e\ e'$. When the car is to be started forward, the brakeman moves the lever P to his right; this moves the lever B in the opposite direction, and the spring-case $a\ a'$ is moved on the axle F and clutches the pin $d$. The stop $g$ actuates the ratchet $e$ and relieves the spring-case, thus transmitting the whole force of the spring to the wheels D to move the car forward. The car is propelled onward independent of any other force, and will run until the whole power of the spring and the momentum of the car are expended, thus saving nearly all the power usually lost in stopping the car. In descending an inclined plane the operator may apply this brake and reserve the power, holding it until wanted, and then applying it to assist in ascending an inclined plane. As it is often necessary to stop a car very suddenly to avoid accidents, we provide a guard-brake that may be operated by foot. When this brake is not in operation the treadle $y$ on the right is down, and the rocking-lever $l$ tips to the right; but in case the car is to be suddenly stopped, the operator steps on the treadle $y'$ on the left; this rocks the lever $l$ to the left, and being connected to the lever C, the arms $j\ j$ are actuated, and the brake-pads H H come in contact with the periphery of the wheels D, which, turning under the pads H, the friction tends to draw the pads on to the wheels, and brings a powerful strain on the rods $h$ which connect the brakes G and pads H. It will be seen that the wheel is clamped powerfully between the brake and pad, figs. 2 and 3, and the axle is not strained as it is with the common brake; thus the friction of the wheel D on the pad H assists the brakeman, and a car can be very suddenly stopped by a slight effort of the foot, leaving both hands free to manage the horses. These improvements may be operated at either end of the car, which can be run in either direction with equal facility; and the spring $v$ cannot be injured by being wound backwards, as the spring turns in either direction freely on the pivots $p\ p'$, fig. 6. If the operator neglects to unclutch the brake after the force of the spring is expended, the car may continue to run onward, and there is no liability of damage to the spring or any other part of the brake. This is accomplished by means of the peculiar mode of attachment of the spring on the pivots $p\ p'$, allowing the spring to turn and wind in the opposite direction without breakage. By the case $a'$ extending through the hub of the disk $a$, and forming a bearing upon which the disk $a$ revolves, the axle is relieved of all friction caused by the action of the spring, and the axle F will revolve freely in the case $a'\ a$. The pivots $p\ p'$, being held at both ends, are very firm and strong, and the pivot-boxes $u$ and $w$, on the ends of the spring $v$, turn on them freely in the recesses formed by the lips $r$ and $r'$ in either direction, without liability of breaking from their fastenings, (as they do in the common mode of attaching springs,) shown in figs. 6 and 7.

Having thus described the nature and operation of our invention, what we claim as our invention and desire to secure by Letters Patent, is—

1. We claim the spring-case $a\ a'$, constructed in such a manner, with pins $p\ p'$ and supporting flanges, that the spring may be wound in either direction, substantially as described.

2. The extension $e''$, upon the disk $a$, fitted into the case $a'$, on the axle, as described, and for the purpose set forth.

3. The double case $a\ a'$, constructed as described, and arranged to slide upon the axle and catch in stops $d\ d'$, substantially as described and for the purpose set forth.

4. The lever B, with secondary lever P, in combination with the case $a\ a'$, and operating the same.

5. In combination with lever B and case $a\ a'$, the pawls $e\ e'$, springs $f\ f'$, and stops $g\ g'$, constructed and arranged substantially as described and for the purposes set forth.

6. The construction of a car-brake with mechanism substantially as described, and so arranged that the friction of the wheel on the brake-pad H shall tend to draw on the brakes and clamp the wheel between the brakes G and H, substantially as and for the purpose set forth.

7. In combination with the above, we claim the operating devices consisting of the lever C, shaft E, arms $j\ j$, lever $l$, and treadles $y\ y$, substantially as described.

GEORGE E. BURT,
EDWIN A. HILDRETH.

Witnesses:
S. B. HILDRETH,
E. E. BURT.